(12) United States Patent
Thirumalai et al.

(10) Patent No.: US 11,248,480 B2
(45) Date of Patent: Feb. 15, 2022

(54) INTERSEGMENT SEAL FOR CMC BOAS ASSEMBLY

(71) Applicant: United Technologies Corporation, Farmington, CT (US)

(72) Inventors: Sudarshan Thirumalai, Westborough, MA (US); William M. Barker, North Andover, MA (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 160 days.

(21) Appl. No.: 16/567,492

(22) Filed: Sep. 11, 2019

(65) Prior Publication Data

US 2021/0071541 A1 Mar. 11, 2021

(51) Int. Cl.
F01D 11/00 (2006.01)

(52) U.S. Cl.
CPC ........ F01D 11/005 (2013.01); *F05D 2240/11* (2013.01)

(58) Field of Classification Search
CPC ...... F01D 11/00; F01D 11/005; F01D 11/006; F01D 11/008; F05D 2240/11; F05D 2240/10
USPC ........................................................ 277/590
See application file for complete search history.

(56) References Cited

U.S. PATENT DOCUMENTS

| | | | | |
|---|---|---|---|---|
| 4,759,555 A | * | 7/1988 | Hailing | F16J 9/18 277/631 |
| 6,076,835 A | * | 6/2000 | Ress | F01D 11/005 277/637 |
| 6,199,871 B1 | * | 3/2001 | Lampes | F01D 11/005 277/614 |
| 10,683,768 B2 | | 6/2020 | Snyder et al. | |
| 2016/0053627 A1 | | 2/2016 | Duguay | |
| 2016/0084101 A1 | * | 3/2016 | McCaffrey | F01D 5/225 415/173.3 |
| 2016/0319687 A1 | * | 11/2016 | Thomas | F01D 11/005 |
| 2017/0009594 A1 | * | 1/2017 | Snyder | F01D 11/005 |
| 2017/0101882 A1 | | 4/2017 | Sippel et al. | |
| 2018/0149030 A1 | | 5/2018 | Freeman et al. | |

FOREIGN PATENT DOCUMENTS

EP 3620612 11/2020

OTHER PUBLICATIONS

EP Search Report for EP Application No. 20192953.6 dated Sep. 12, 2020.

* cited by examiner

*Primary Examiner* — Nathan Cumar

(74) *Attorney, Agent, or Firm* — Carlson, Gaskey & Olds, P.C.

(57) ABSTRACT

A blade outer air seal assembly includes a blade outer air seal that has a plurality of segments that extend circumferentially about an axis and are mounted in a carrier. At least two of the plurality of segments have a first wall and a second wall circumferentially spaced from one another and a base portion that extends from the first wall to the second wall. The base portion extends circumferentially outward past the first and second walls to form first and second sealing surfaces. An intersegment seal has a curved surface. The curved surface is engaged with the first and second sealing surfaces between the at least two segments.

20 Claims, 5 Drawing Sheets

INTERSEGMENT SEAL FOR CMC BOAS ASSEMBLY

BACKGROUND

This application relates to an intersegment seal for a blade outer air seal assembly and method of manufacturing an intersegment seal.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a blade outer air seal assembly includes a blade outer air seal that has a plurality of segments that extend circumferentially about an axis and are mounted in a carrier. At least two of the plurality of segments have a first wall and a second wall circumferentially spaced from one another and a base portion that extends from the first wall to the second wall. The base portion extends circumferentially outward past the first and second walls to form first and second sealing surfaces. An intersegment seal has a curved surface. The curved surface is engaged with the first and second sealing surfaces between the at least two segments.

In a further embodiment of any of the above, the curved surface has a radius of curvature between about 0.050 and 0.300 inches (1.27-7.62 mm).

In a further embodiment of any of the above, the curved surface is on a radially inner side of the intersegment seal. A second curved surface is on a radially outer side of the intersegment seal.

In a further embodiment of any of the above, the second curved surface has a radius of curvature between about 0.020 and 0.150 inches (0.508-3.81 mm).

In a further embodiment of any of the above, the curved surface is on a radially inner side of the intersegment seal and a radially outer side has a flat surface.

In a further embodiment of any of the above, the first and second sealing surfaces taper radially inward.

In a further embodiment of any of the above, a clip secures the intersegment seal between the at least two segments.

In a further embodiment of any of the above, the clip has first and second wings that engage with the first and second walls of the at least two seal segments.

In a further embodiment of any of the above, the clip includes a tab at an axial side for axial retention of the intersegment seal.

In a further embodiment of any of the above, the clip includes a radial tab configured to bias the intersegment seal radially inward.

In a further embodiment of any of the above, the radial tab is a spring loaded tab.

In a further embodiment of any of the above, the clip is a metallic material.

In a further embodiment of any of the above, the intersegment seal is formed from a ceramic material.

In a further embodiment of any of the above, the at least two segments are a ceramic material.

In another exemplary embodiment, a method of manufacturing a blade outer air seal assembly includes laying a plurality of laminates to form a seal body. Excess material is machined off the seal body to form a seal segment that has first and second walls and a base portion. The excess material is machined to form an intersegment seal.

In a further embodiment of any of the above, the seal body is densified before the machining steps.

In a further embodiment of any of the above, the intersegment seal is densified after the machining steps.

In a further embodiment of any of the above, the seal body is formed about a mandrel.

In a further embodiment of any of the above, the mandrel has a generally triangular cross section.

In a further embodiment of any of the above, a flat top surface of the intersegment seal is machined.

DETAILED DESCRIPTION

Figure 1:
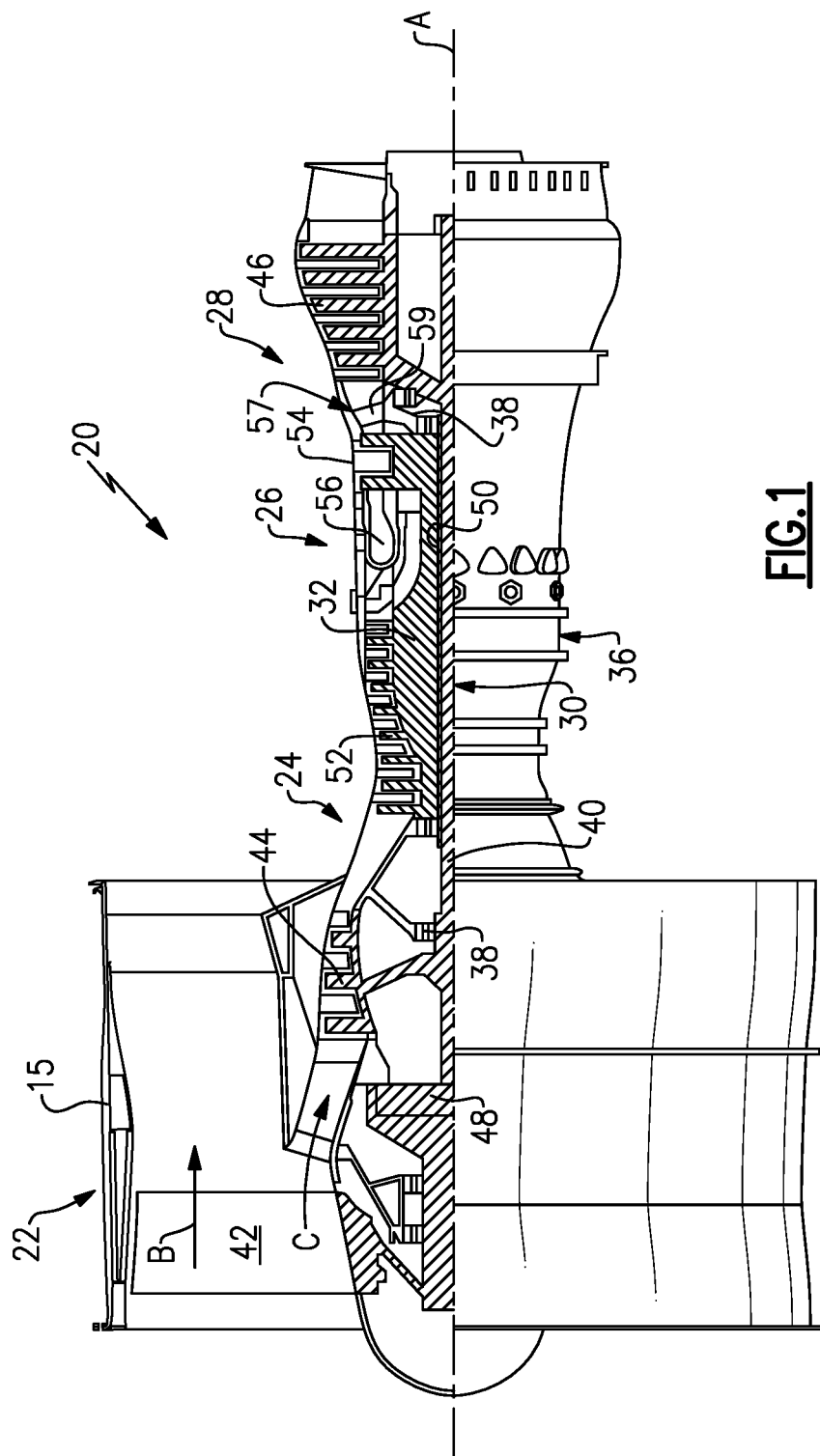
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{ R})/(518.7^\circ \text{R})]^{0.5}$. The "Low corrected fan tip speed" as disclosed herein according to one non-limiting embodiment is less than about 1150 ft/second (350.5 meters/second).

Figure 2:
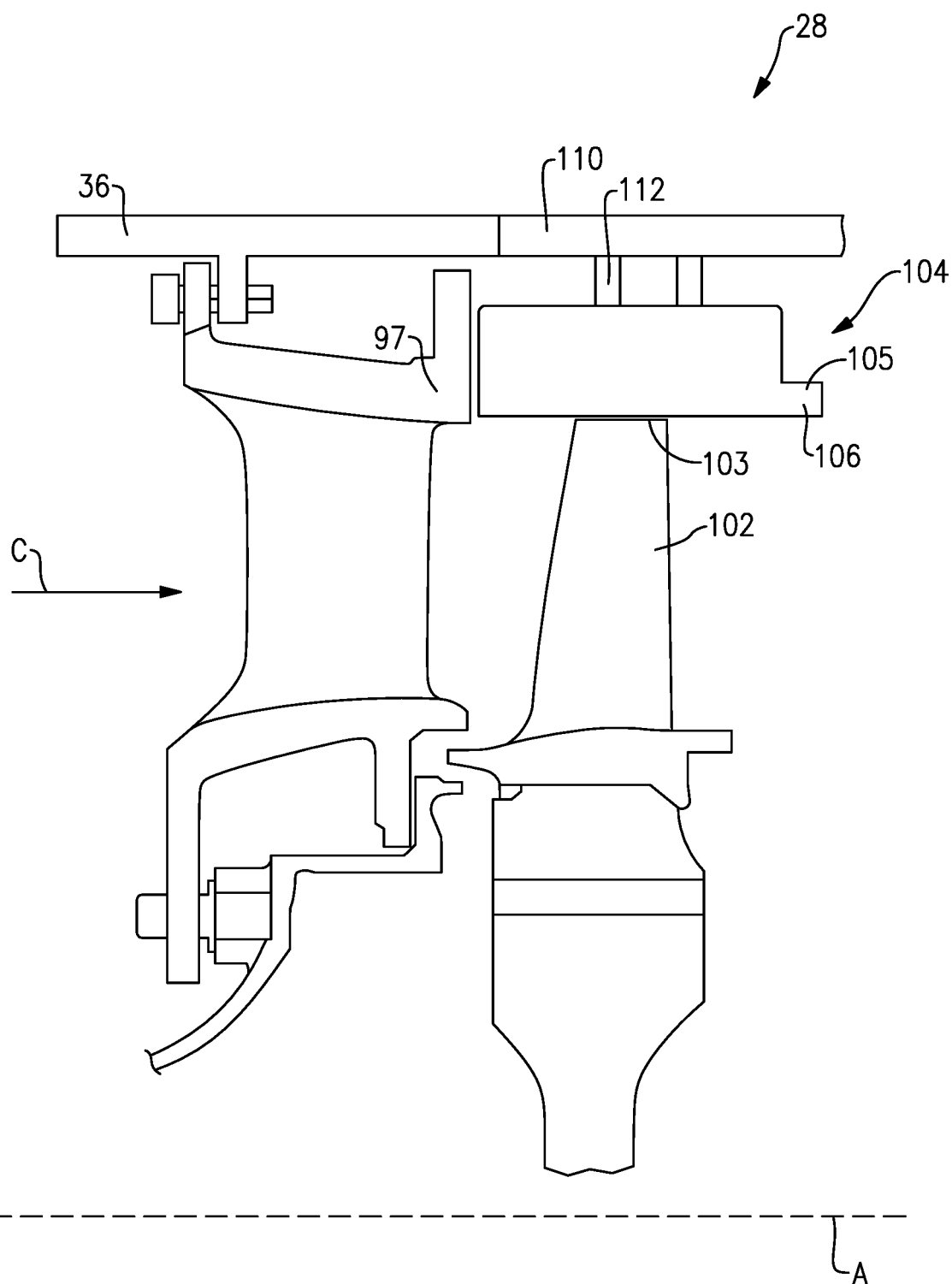
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC") or monolithic ceramic.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
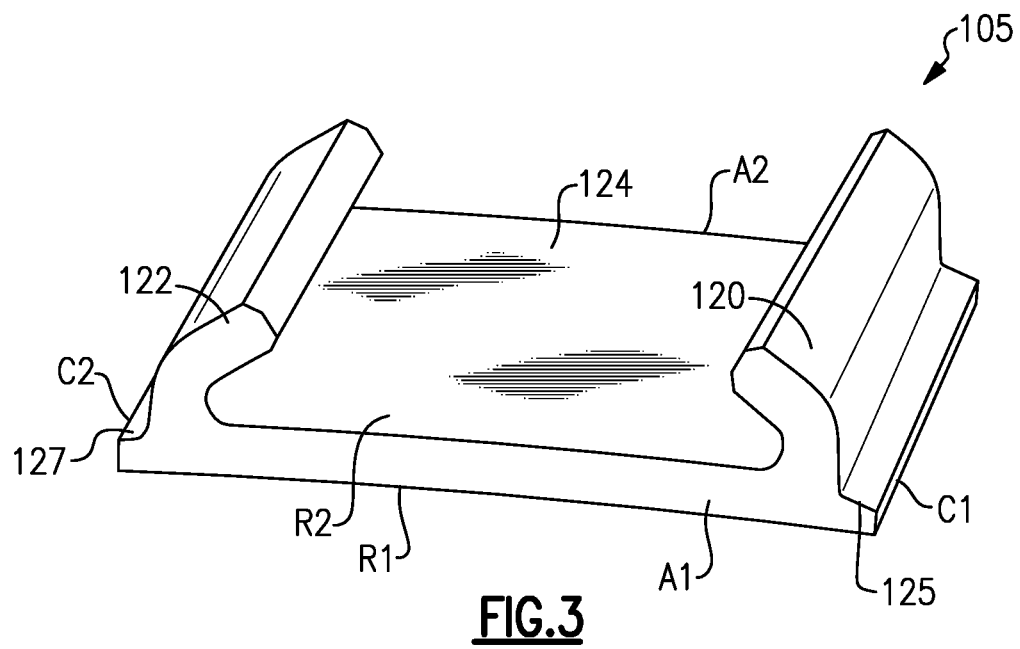
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 circumferentially spaced from a second wall 122. The first and second walls 120, 122 extend generally radially outward from a base portion 124. The first and second walls 120, 122 extend along an axial length of the seal segment 105. The first and second walls 120, 122 may be angled toward one another, in one example. The first and second walls 120, 122 are arranged near the first and second circumferential sides C1, C2, respectively. The base portion 124 extends between the first and second axial sides A1, A2 and defines a gas path on a radially inner side and a non-gas path on a radially outer side. The base portion 124 extends circumferentially beyond the first and second walls 120, 122 to form seal surfaces 125, 127, respectively. The sealing surfaces 125, 127 may taper radially inward, for example. In this disclosure, forward, aft, upstream, downstream, axial, radial, or circumferential is in relation to the engine axis A unless stated otherwise. The base portion 124 may extend axially forward and/or aft of the first and second walls 120, 122 to provide a surface for sealing of the BOAS first and second axial sides A1, A2.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further densified by adding additional material to coat the laminates. In some examples, the base portion 124 and first and second walls 120, 122 may be formed from the same number of laminate plies, and thus have substantially the same thickness. The simple arrangement of the base portion 124 and first and second walls 120, 122 allows for a simple ply layup.

Figure 4:
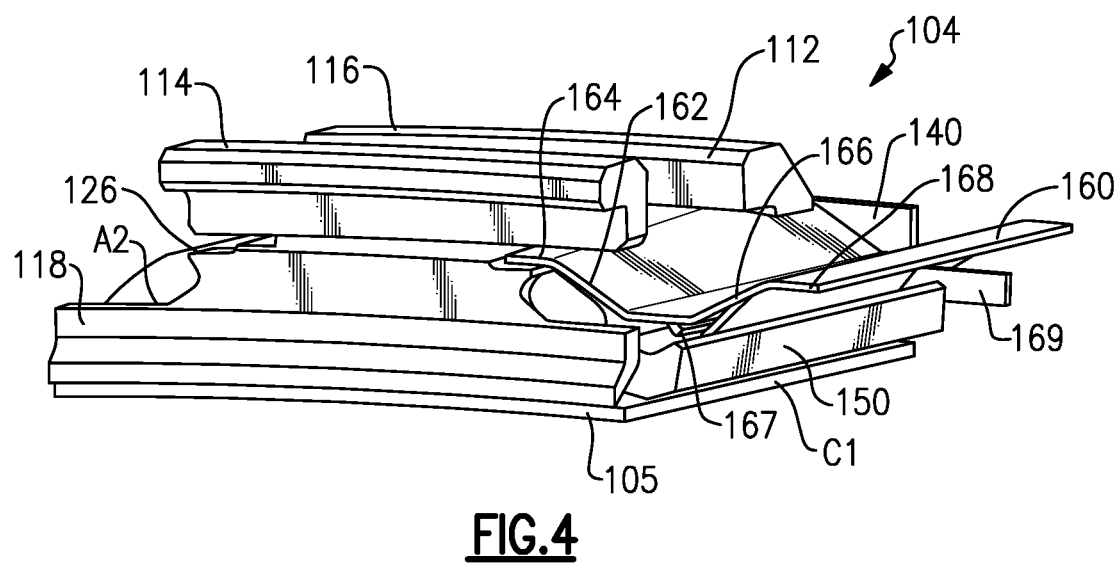
FIG. 4 illustrates an exemplary blade outer air seal assembly.

FIG. 4 illustrates a portion of an example BOAS assembly 104. The BOAS segment 105 is mounted in a carrier 112. The carrier 112 fits between the walls 120, 122. The carrier 112 has hooks 114, 116 for securing the carrier 112 and BOAS segment 105 to the support structure 110. The carrier 112 has a aft portion 118 that secures the BOAS segment 105 in the axial direction. The aft portion 118 extends in the circumferential direction and engages the second axial side A2 of the BOAS segment 105. In other embodiments, the carrier 112 may have a front portion that engages the first axial side A1 of the BOAS segment 105.

An intersegment seal 150 is arranged between adjacent seal segments 105. The intersegment seal 150 is in engagement with the sealing surface 125. The intersegment seal 150 extends along most of the axial length of the BOAS segment 105. The intersegment seal 150 is held in place by a clip 160. The clip 160 may be spring loaded to bias the intersegment seal 150 radially inward, for example. The clip 160 generally includes first and second wings 162, 166 that extend radially outward and circumferentially outward. An end portion 164, 168 of each of the wings 162, 166 engages with the carrier 112. A slot 126 may be formed in the carrier 112 radially inward of the hooks 114, 116. The slot 126 receives the clip 160. The clip 160 may include a forward tab 169 to axially retain the clip 160 in place. An L-seal 140 may be arranged at a forward portion of the assembly 104. The L-seal 140 may engage the first axial side A1 of the BOAS segment 105 and the clip 160.

Figure 5:
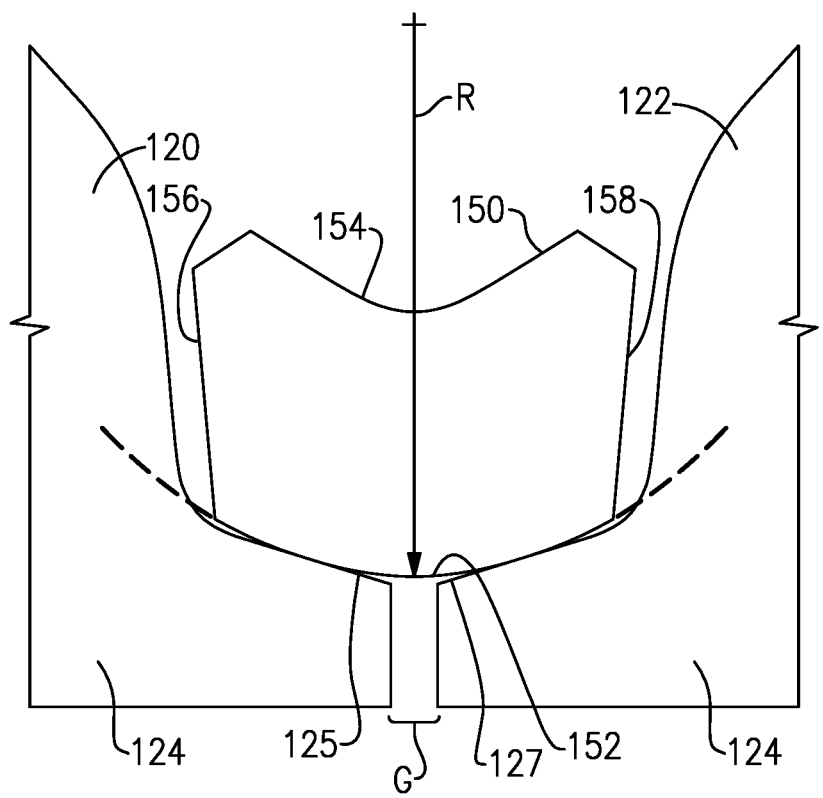
FIG. 5 illustrates a portion of the exemplary blade outer air seal assembly.

FIG. 5 illustrates a portion of the BOAS assembly 104. The intersegment seal 150 is arranged between two adjacent BOAS segments 105. A gap G is formed between the BOAS segments 105. The intersegment seal 150 is in engagement with the sealing surfaces 125, 127 of the BOAS segments 105, spanning across the gap G. The intersegment seal 150 has a radially inner curved surface 152. An outer surface 154 is opposite the inner curved surface 152. The outer surface 154 may also be curved, or may be flat. Side surfaces 156, 158 extend between the inner curved surface 152 and the outer surface 154. The side surfaces 156, 158 extend generally parallel to the first and second walls 120, 122, respectively. In some examples, a chamfer is formed between the outer surface 154 and the side surfaces 156, 158.

The inner curved surface 152 has a radius of curvature R. In some examples, the radius of curvature R may be between about 0.050 and 0.300 inches (1.27-7.62 mm). In a further embodiment, the radius of curvature R may be about 0.150 inches (3.81 mm). In some examples, the outer surface 154 has a smaller radius of curvature than the inner curved surface 152. In some examples, the outer surface has a radius of curvature between about 0.020 and 0.150 inches (0.508-3.81 mm). In a further example, the outer surface 154 may have a radius of curvature of about 0.050 inches (1.27 mm), for example. The gap G may change size with thermal changes in the components. The inner curved surface 152 self-centers over the gap G as the gap G changes size.

Figure 6:
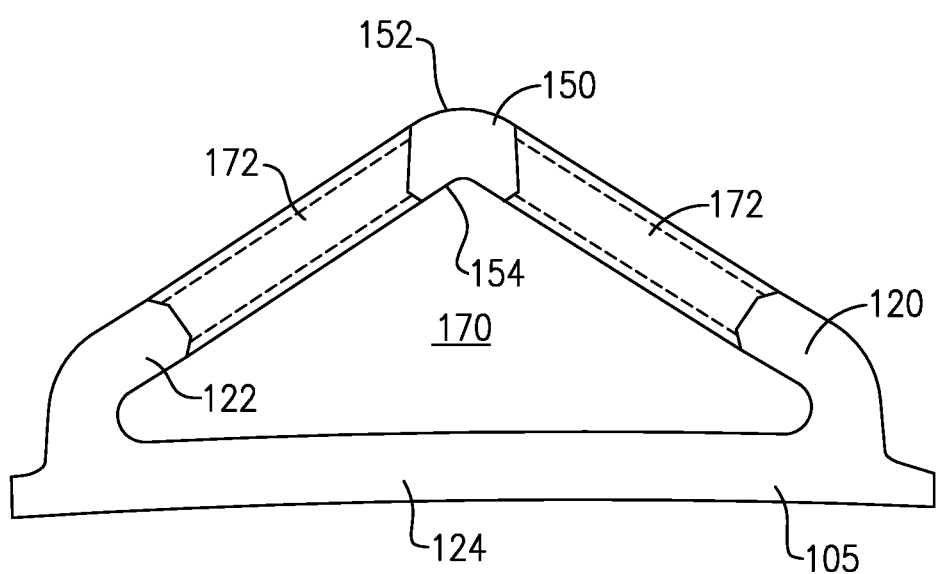
FIG. 6 illustrates a method step of manufacturing a blade outer air seal assembly.

FIG. 6 illustrates an example method step of manufacturing a BOAS segment 105 and intersegment seal 150. The BOAS segment 105 is formed by laying a plurality of laminate plies in tooling to form a seal body. The laminates may be wrapped around a mandrel 170, for example. Excess material 172 is machined away from the seal body to form the first and second walls 120, 122 and base portion 124. The seal body may be densified before the machining of the excess material 172. Some of the excess material 172 is used to form the intersegment seal 150. Thus, the intersegment seal 150 is made from already densified material that may otherwise have been discarded. The intersegment seal may also be formed and densified independently from the BOAS in its own fixture. The intersegment seal 150 is then machined to its final shape. For example, the radially outer surface, side surfaces, and chamfers may be machined into the intersegment seal 150.

In one embodiment, the mandrel 170 has a generally triangular cross section. The mandrel 170 may be an isosceles triangle, for example. The first and second walls 120, 122 extend circumferentially inward at the same angle relative to the circumferential direction. This forms a third angle at the intersegment seal 150. Although an example method is shown, the intersegment seal 150 may be formed with different methods and/or different materials. For example, the intersegment seal 150 may be a metallic material, in some examples.

Figure 7A:
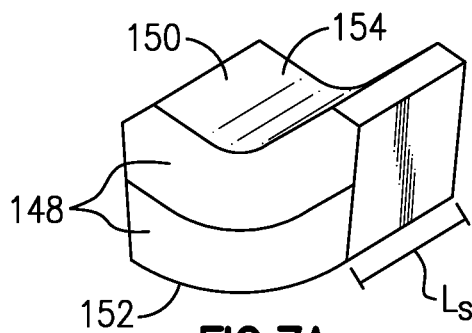
FIG. 7A illustrates an exemplary intersegment seal.

FIG. 7A illustrates a first example intersegment seal 150. The intersegment seal 150 is formed from a plurality of CMC laminate plies 148. The plies 148 form the radially inner curved surface 152 and the outer surface 154. The plie arrangement ensures forces on the intersegment seal 150 are primarily directed through the plies 148, rather than along them, improving stresses in the seal 150. The intersegment seal 150 has a length Ls in the axial direction. The length Ls extends at least most of an axial length of the BOAS segment 105.

Figure 7B:
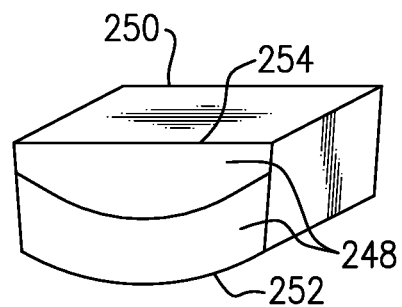
FIG. 7B illustrates another exemplary intersegment seal.

FIG. 7B illustrates another example intersegment seal 250. The intersegment seal 250 is also formed from a plurality of CMC laminate plies 248. The inner surface 152 is curved, while the outer surface 254 is flat. That is, the outer surface 254 is substantially parallel to the base portion 124 of the BOAS segment 105. In this example, the flat outer surface 254 may be machined into the plies 248.

Figure 8A:
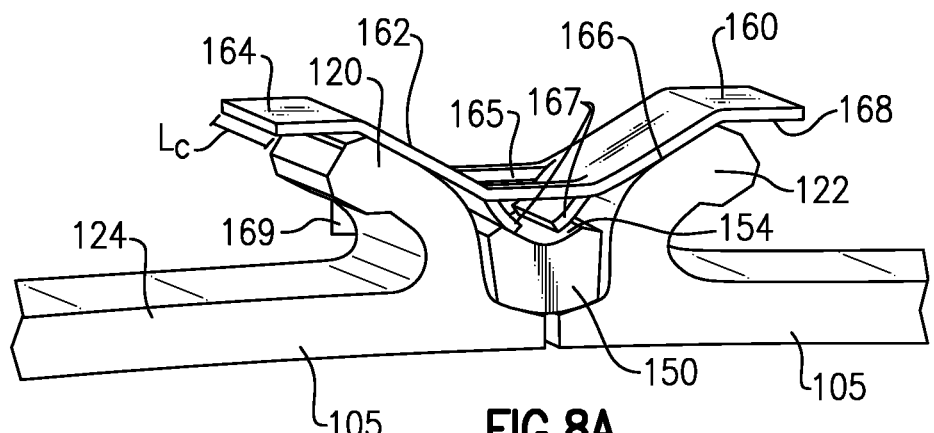
FIG. 8A illustrates a blade outer air seal assembly with the intersegment seal of FIG. 7A.

FIG. 8A illustrates the BOAS assembly 104 with an example clip 160. The clip 160 generally includes first and second wings 162, 166 that extend radially outward and circumferentially outward. An end portion 164, 168 of each of the wings 162, 166 engages with the carrier 112. A window 165 in a center of the clip 160 forms tabs 167. The tabs 167 extend radially inward and contact the outer surface 154 of the intersegment seal 150. In this example, the tabs 167 extend in an axial direction. The tabs 167 are spring loaded to bias the intersegment seal 150 radially inward. Although two tabs 167 are illustrated, one or more tabs 167 may be used. An aft tab 169 may be arranged at an aft end of the clip 160. The aft tab 169 engages with the BOAS segments 105 to retain the clip 160 axially. The clip 160 has a length Lc in the axial direction. The length Lc may be the same as the length Ls, in some examples. In other embodiments, the length Lc may be smaller than the length Ls.

Figure 8B:
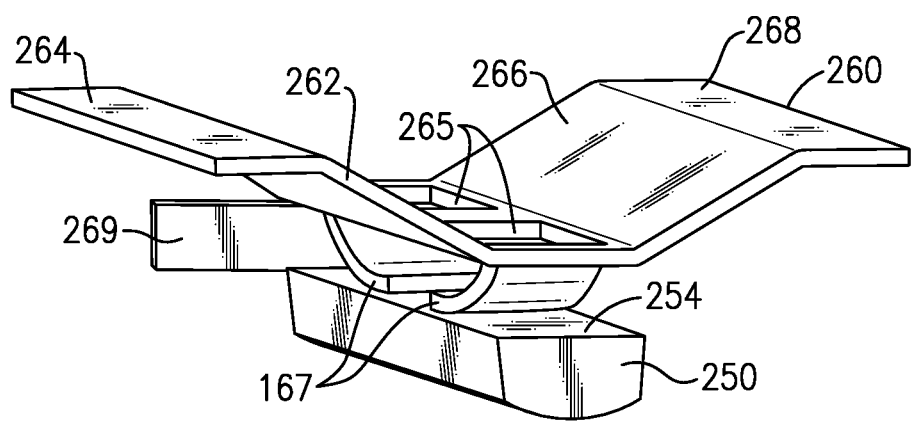
FIG. 8B illustrates a blade outer air seal assembly with the intersegment seal of FIG. 7B.

FIG. 8B illustrates another example clip 260. This example clip 260 may be used with the intersegment seal 250 having a flat outer surface 254. The clip 260 also has first and second wings 262, 266 that extend radially outward and end portions 264, 268 of the wings 262, 266 engage with the first and second walls 120, 122 of the BOAS segments 105. The example clip 260 includes two windows 265 forming two tabs 167. In this example, the tabs 167 extend generally circumferentially across the flat outer surface 254. Although two tabs 167 are illustrated, one or more tabs 167 may be used.

The disclosed CMC BOAS assembly with a CMC intersegment seal provides a simple, lightweight, cost efficient way to seal intersegment gaps. The intersegment seal reuses densified CMC material, which may reduce costs. The CMC intersegment seal geometry ensures loading is perpendicular to the plies, which provides structural rigidity. The intersegment seal geometry further provides a self-centering seal. The arrangement eliminates the need for feather seal slots and reduces the risk of delamination on the BOAS segment. The CMC intersegment seal provides high temperature capability and reduces weight compared to known metallic seals.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a blade outer air seal having a plurality of segments extending circumferentially about an axis and mounted in a carrier;
   at least two of the plurality of segments having a first wall and a second wall circumferentially spaced from one another and a base portion extending from the first wall to the second wall, the base portion extending circumferentially outward past the first and second walls to form first and second sealing surfaces; and
   an intersegment seal having a curved surface, the curved surface engaged with the first and second sealing surfaces between the at least two segments.

2. The blade outer air seal assembly of claim 1, wherein the curved surface has a radius of curvature between about 0.050 and 0.300 inches (1.27-7.62 mm).

3. The blade outer air seal assembly of claim 1, wherein the curved surface is on a radially inner side of the intersegment seal and a second curved surface is on a radially outer side of the intersegment seal.

4. The blade outer air seal assembly of claim 3, wherein the second curved surface has a radius of curvature between about 0.020 and 0.150 inches (0.508-3.81 mm).

5. The blade outer air seal assembly of claim 3, wherein the second curved surface has a second radius of curvature that is smaller than the radius of curvature of the curved surface.

6. The blade outer air seal assembly of claim 1, wherein the curved surface is on a radially inner side of the intersegment seal and a radially outer side has a flat surface.

7. The blade outer air seal assembly of claim 1, wherein the first and second sealing surfaces taper radially inward.

8. The blade outer air seal assembly of claim 1, wherein the intersegment seal is formed from a ceramic material.

9. The blade outer air seal assembly of claim 1, wherein the at least two segments are a ceramic material.

10. The blade outer air seal assembly of claim 1, wherein the first and second walls are angled toward one another.

11. The blade outer air seal assembly of claim 1, wherein the intersegment seal has an axial length that extends along most of a segment axial length of the plurality of segments.

12. A blade outer air seal assembly, comprising:
    a blade outer air seal having a plurality of segments extending, circumferentially about an axis and mounted in a carrier;
    at least two of the plurality of segments having a first wall and a second wall circumferentially spaced from one another and a base portion extending from the first wall to the second wall, the base portion extending circumferentially, outward past the first and second walls to form first and second sealing surfaces; and
    an intersegment seal having a curved surface, the curved surface engaged with the first and second sealing surfaces between the at least two segments, and wherein a clip secures the intersegment seal between the at least two segments.

13. The blade outer air seal assembly of claim 12, wherein the clip has first and second wings that engage with the first and second walls of the at least two seal segments.

14. The blade outer air seal assembly of claim 12, wherein the clip includes a tab at an axial side for axial retention of the intersegment seal.

15. The blade outer air seal assembly of claim 12, wherein the clip includes a radial tab configured to bias the intersegment seal radially inward.

16. The blade outer air seal assembly of claim 15, wherein the radial tab is a spring loaded tab.

17. The blade outer air seal assembly of claim 12, wherein the clip is a metallic material.

18. The blade outer air seal assembly of claim 12, wherein an L-seal engages a first axial side of the at least two of the plurality of segments and the clip.

19. The blade outer air seal assembly of claim 12, wherein the intersegment seal is formed from a ceramic material.

20. The blade outer air seal assembly of claim 12, wherein the at least two segments are a ceramic material.

* * * * *